(12) United States Patent
Chang et al.

(10) Patent No.: US 7,552,116 B2
(45) Date of Patent: Jun. 23, 2009

(54) METHOD AND SYSTEM FOR EXTRACTING WEB QUERY INTERFACES

(75) Inventors: Kevin Chen-Chuan Chang, Champaign, IL (US); Zhen Zhang, Champaign, IL (US); Bin He, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 275 days.

(21) Appl. No.: 10/913,721

(22) Filed: Aug. 6, 2004

(65) Prior Publication Data

US 2006/0031202 A1 Feb. 9, 2006

(51) Int. Cl.
*G06F 17/30* (2006.01)
*G06F 17/27* (2006.01)
(52) U.S. Cl. .................................. 707/5; 707/6; 704/9
(58) Field of Classification Search ................ None
See application file for complete search history.

(56) References Cited

U.S. PATENT DOCUMENTS 5,317,647 A * 5/1994 Pagallo ..................... 382/161
5,678,052 A * 10/1997 Brisson ........................ 704/4
5,933,822 A * 8/1999 Braden-Harder et al. ....... 707/5
5,960,384 A * 9/1999 Brash ........................... 704/9
6,275,301 B1 * 8/2001 Bobrow et al. .............. 358/1.2
2003/0023628 A1 * 1/2003 Girardot et al. ............. 707/513
2004/0037474 A1 * 2/2004 Happel ....................... 382/280

OTHER PUBLICATIONS

Helm, Richard; Marriott, Kim; Odersky, Martin; "Building Visual Language Parsers." Association of Computing Machinery 1991.
Arasu, Arvind and Garcia-Molina, Hector; "Extracting Structured Data from Web Pages." SIGMOD 2003, Jun. 9-12, 2003, San Diego, CA.

* cited by examiner

*Primary Examiner*—John R. Cottingham
*Assistant Examiner*—Nirav K Khakhar
(74) *Attorney, Agent, or Firm*—Duane Morris LLP

(57) ABSTRACT

A computer program product being embodied on a computer readable medium for extracting semantic information about a plurality of documents being accessible via a computer network, the computer program product including computer-executable instructions for: generating a plurality of tokens from at least one of the documents, each token being indicative of a displayed item and a corresponding position; and, constructing at least one parse tree indicative of a semantic structure of the at least one document from the tokens dependently upon a grammar being indicative of presentation conventions.

31 Claims, 19 Drawing Sheets

Hidden-syntax hypothesis.

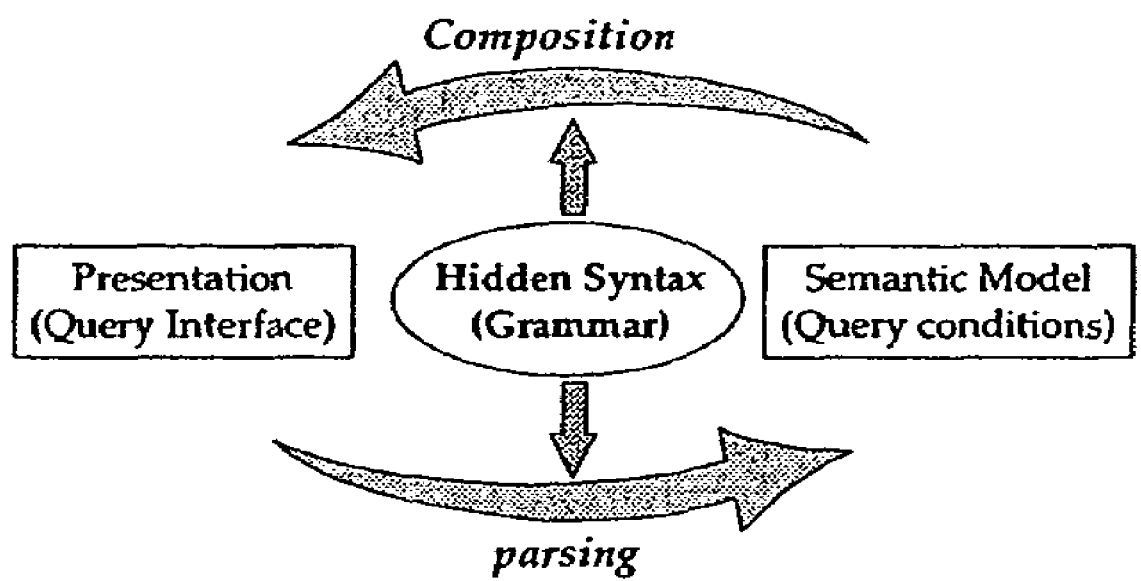
Figure 1: Hidden-syntax hypothesis.

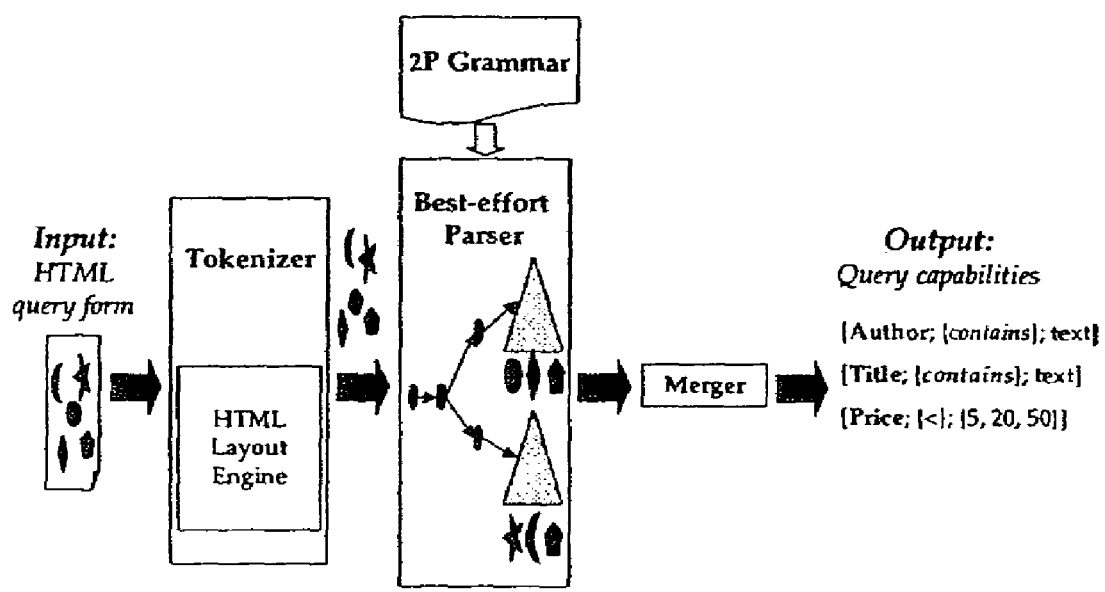
Figure 2: Form extractor for Web query interfaces.

(a) Query interface $Q_{am}$: amazon.com.

(b) Query interface $Q_{aa}$: aa.com.

(c) Examples of condition patterns.

Figure 3: Query interfaces examples.

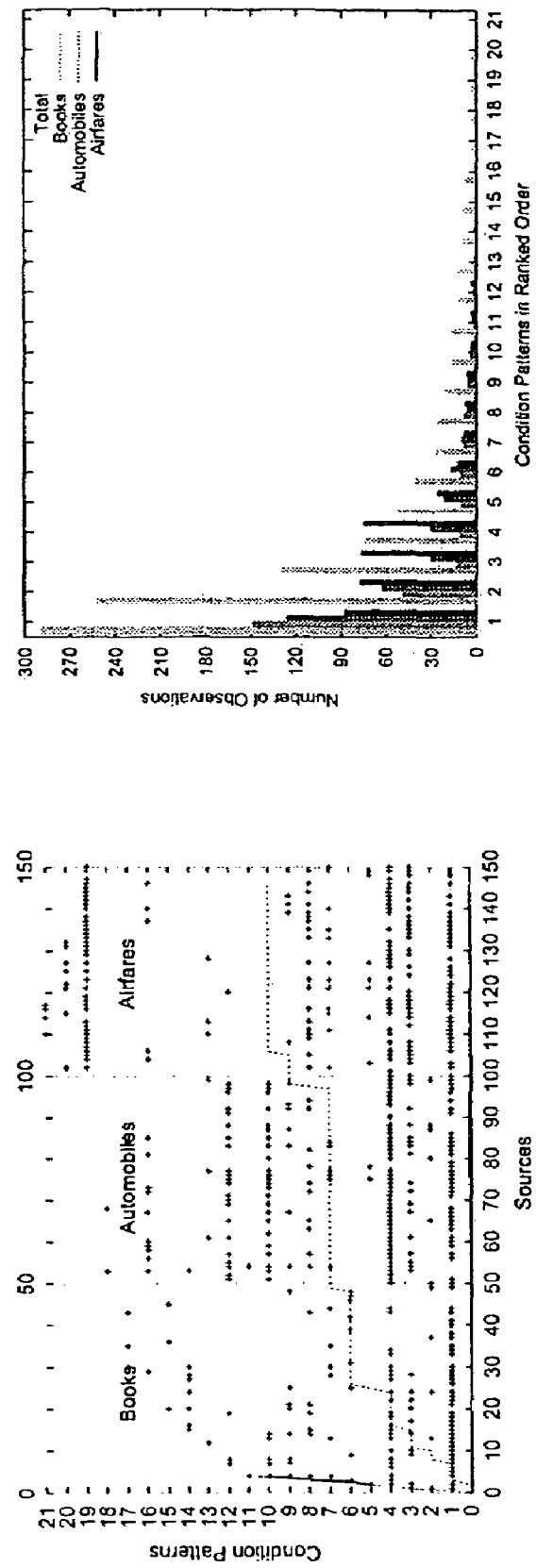
Figure 4: Query vocabulary: condition patterns as building blocks for query interfaces.

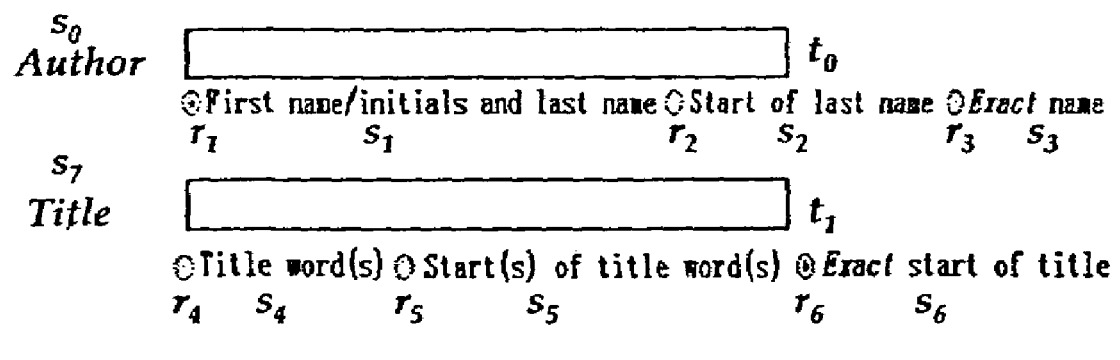
Figure 5: Tokens $T$ in fragment of interface $Q_{am}$.

| # | Production Rules | Visual Patterns |
|---|---|---|
| P1 | QI ← HQI \| Above(QI, HQI) |  |
| P2 | HQI ← CP \| Left(HQI, CP) | 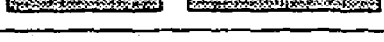 |
| P3 | CP ← TextVal \| TextOp \| EnumRB | |
| P4 | TextVal ← Left(Attr,Val) \| Above(Attr,Val) \| Below(Attr, Val) |  |
| P5 | TextOp ← Left(Attr, Val) ∧ Below(Op, Val) |  |
| P6 | Op ← RBList |  |
| P7 | EnumRB ← RBList | 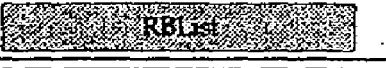 |
| P8 | RBList ← RBU \| Left(RBList RBU) |  |
| P9 | RBU ← Left(radiobutton, text) |  |
| P10 | Attr ← text | |
| P11 | Val ← textbox | |
Figure 6: Productions of the 2P grammar.

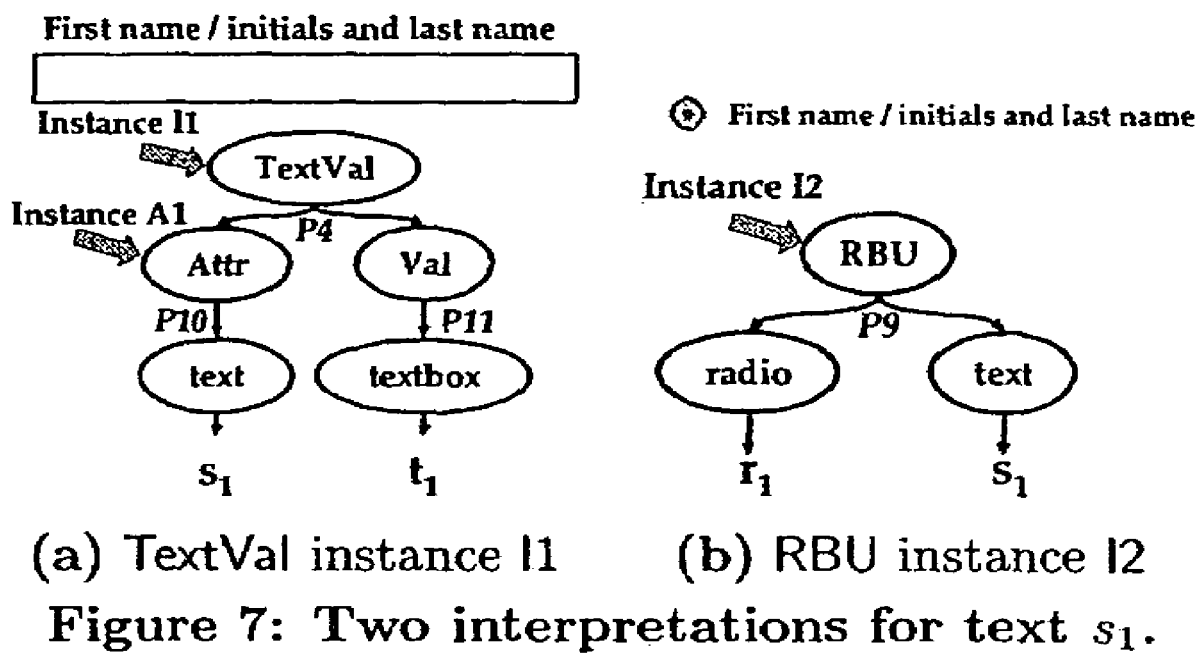
(a) TextVal instance I1     (b) RBU instance I2
Figure 7: Two interpretations for text $s_1$.

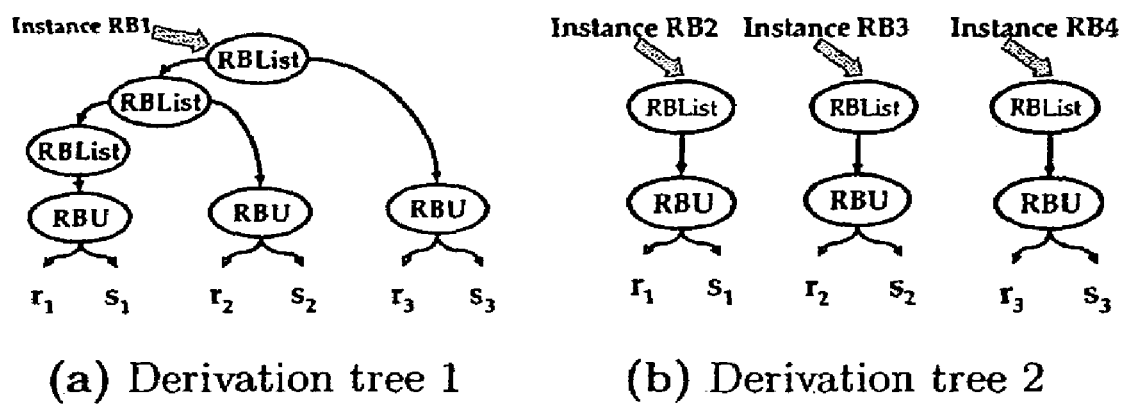
(a) Derivation tree 1   (b) Derivation tree 2
Figure 8: Two interpretations for radio button list.

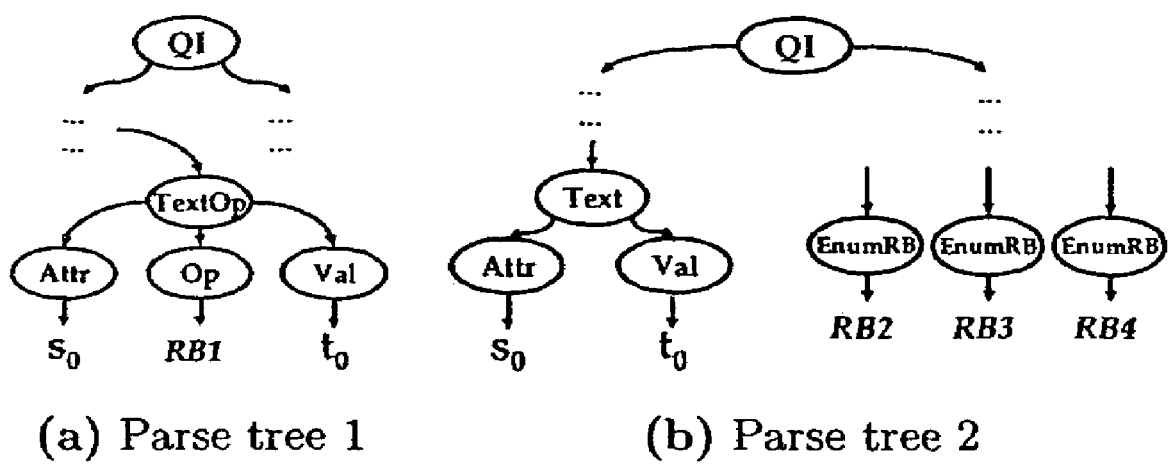
(a) Parse tree 1   (b) Parse tree 2
Figure 9: Two parse trees for query interface $Q_1$.

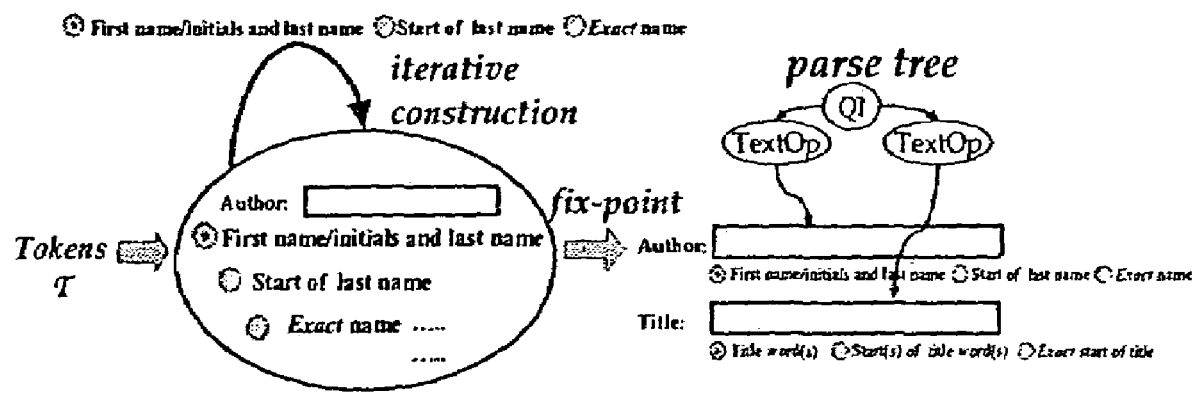
Figure 10: Fix-point parsing process.

```
Proc 2PParser(TS, G):
Input: Token set TS, grammar G
Output: Maximum partial trees res
begin
1   Y = BldSchldGraph(G)
2   find a topological order of symbols in Y
3   for each symbol A in order
4       I += instantiate(A)
5       for each preference R involving A
6           F = enforce R to detect invalidated instances
7           I = I - F
8           for each invalidated instance i ∈ F
9               remove all the instances building upon i in I
10  for each instance i of start symbol s
11      if i is not contained by any other instances of s
12          res += i
end Proc BldSchldGraph(G):
Input: G = (Σ, N, s, Pd, Pf) - grammar
Output: 𝔾 = (V, E) - schedule graph
begin
1   let V = Σ ∪ N
2   for each production p = (H, M, C, F)
3       for each symbol B ∈ M
4           add d-edges (H, B) into E
5   for each preference R defining W over L
6       if 𝔾 + (L, W) is acyclic
7           add r-edge (L, W) into E
8       else
9           add R into transform
10  for each R ∈ transform
11      if indirect r-edges of R do not incur cycle
12          add indirect r-edges of R into E
end Proc instantiate(A):
Input: Symbol A
Output: Instances of A inst
begin
1   inst = ∅
2   repeat
3       for each production p with head being A
4           inst += instances generated by applying p
5   until no new instances added to inst
end
```

FIG. 11

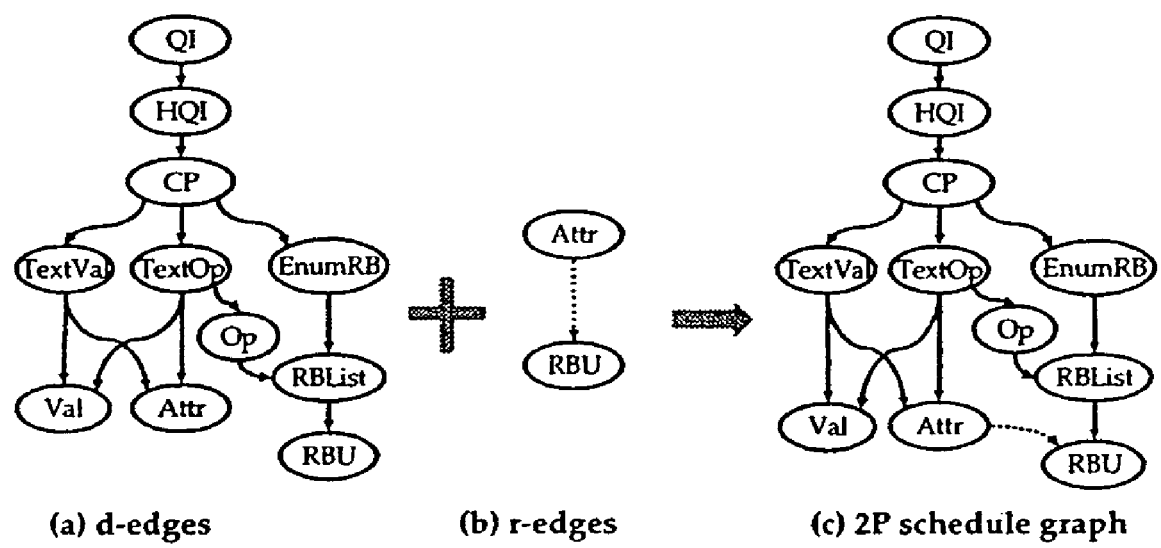
Figure 12: The 2P schedule graph for grammar $\mathcal{G}$.

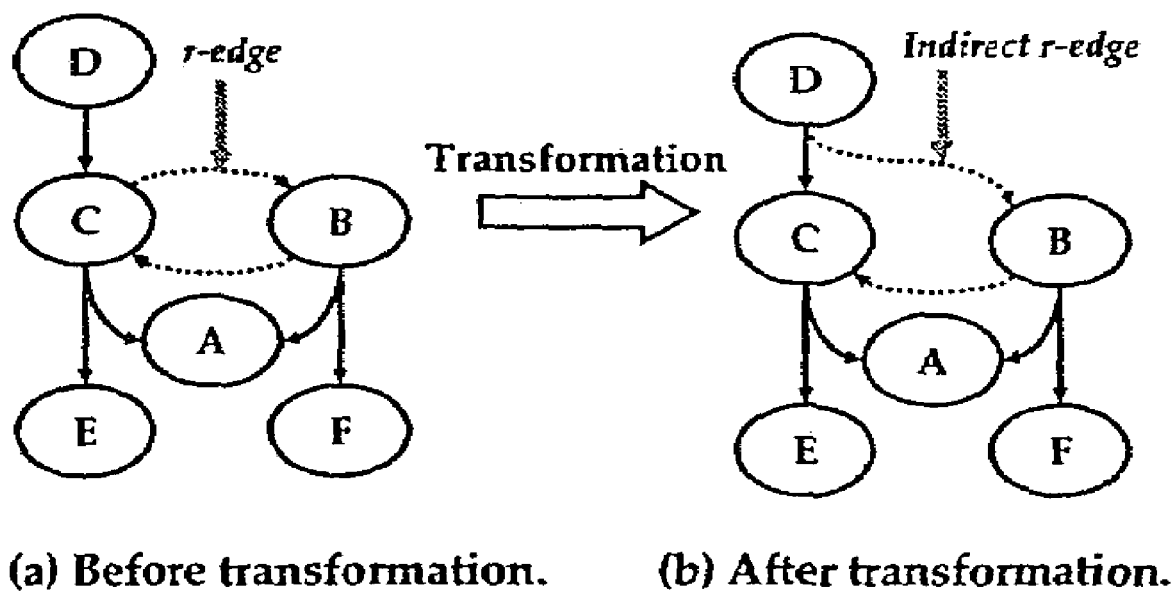
(a) Before transformation.   (b) After transformation.
Figure 13: Transformation of an *r-edge*.

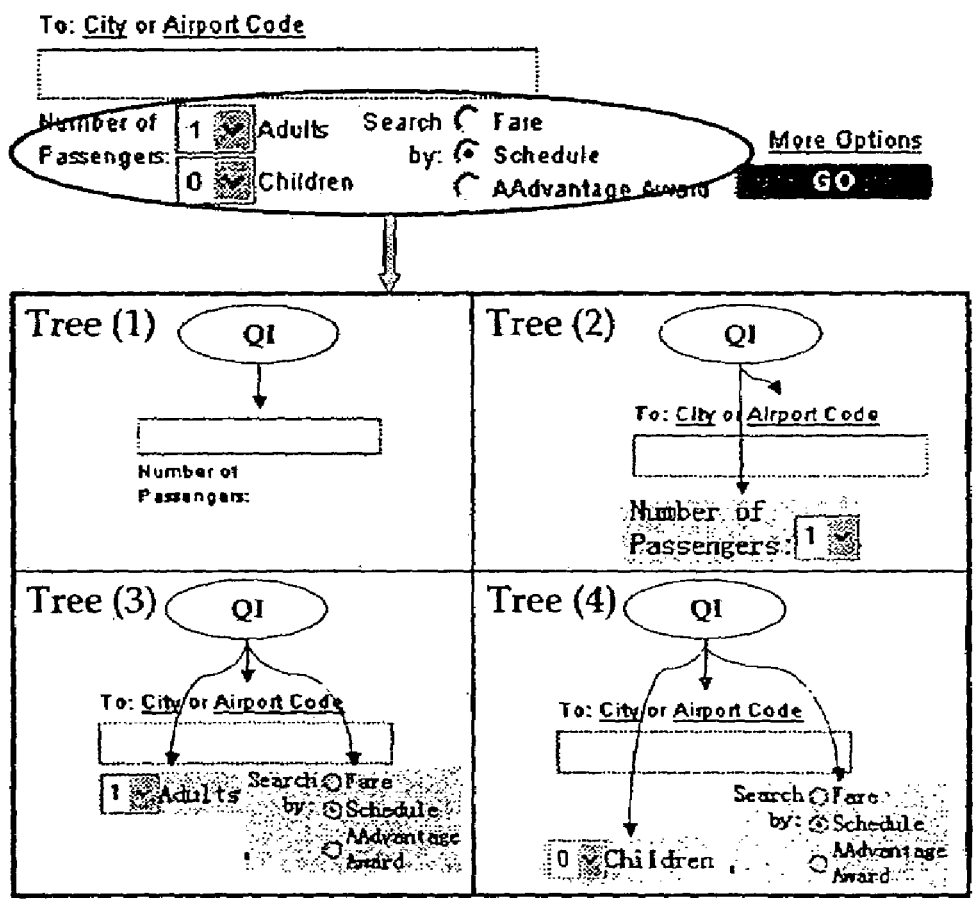
Figure 14: Partial trees for interface $Q_{aa}$ fragment.

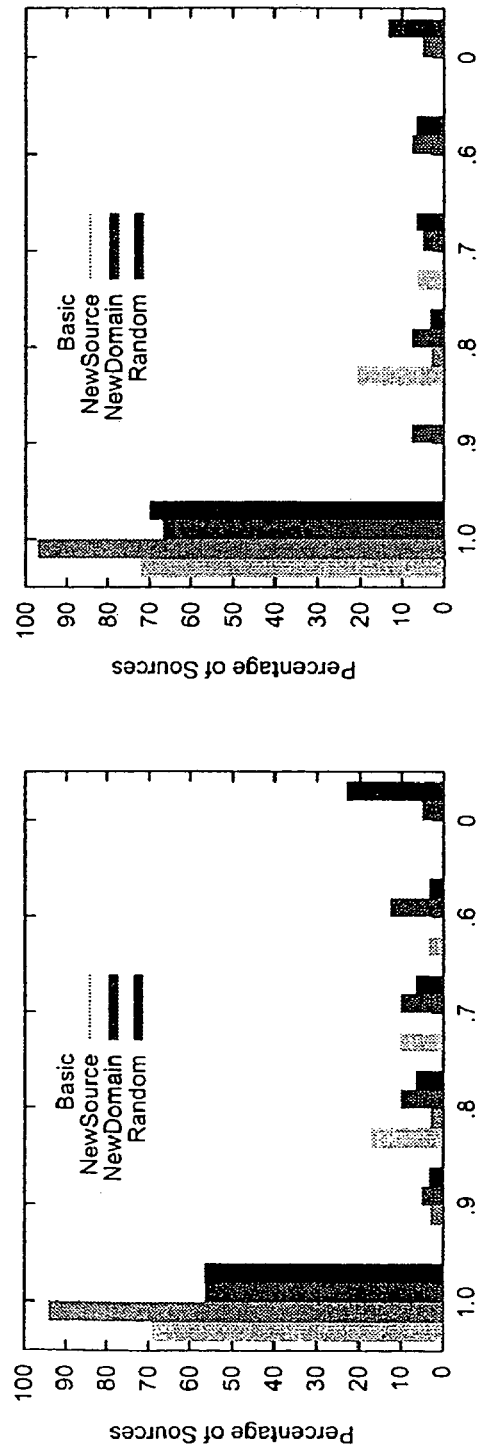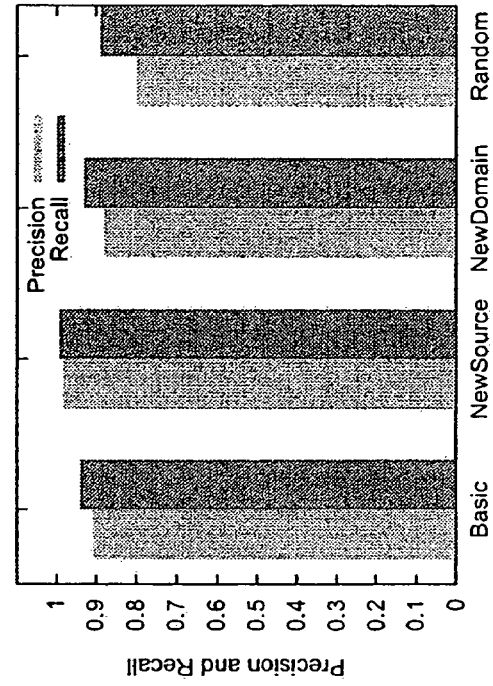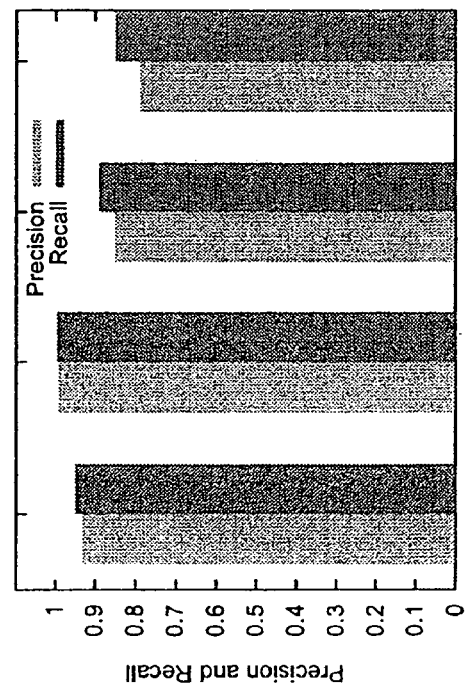
Figure 15: Precision and recall over the four datasets.

FIG. 16

Author: [          ]

Price Range: From: $[    ] To: $[    ]    ● Round Trip  ○ One Way    Format: [All formats ▼]

Departure Date
[05/20/03]    [1 ▼] Adults   Sort by: [Title ▼]   in [Ascending ▼] order leave [May ▼] [21 ▼] [📅]
depart [▼] anytime Return Date:
[Aug ▼] [11 ▼] [Morning ▼]    Time Of: Leave After [-No Pref.- ▼]    From [          ]
[📅]                                                                      ☑ Check nearby airports Pick-Up Date                Pick-Up Time
[05/15/03] [📅]             [1:00 PM ▼] [📅] anytime

Search Options                          Option      Must  Wish  Not
☐ Nonstop flights only                      Air Bag(s)   ○    ●    ○
☐ Avoid most change penalties               Antilock
                                            Brakes       ○    ●    ○
                                            Power
                                            Brakes       ○    ●    ○ city name or airport code [mm/dd/yyyy]    [ ] Unrestricted      Daytime Phone: ([   ]) [   ]-[    ]

Number of Passengers
[    ] [Light (1 suitcase) ▼]

[1 ▼] [adult ▼] ☐ with infant?    Title: [              ]

● Title word(s)  ○ Start(s) of title word(s)  ○ Exact start of title

Date: [08/04/2004] [📅]           Contents [                    ] [ANY of these words ▼]

Search for books by the following Author:    Search by: [TITLE ▼]
                                                                    ○ New York   ○ Las Vegas
Last Name [    ]  First Name (optional) [    ]                      ○ Atlanta    ○ London
                                                                    ○ Boston     ○ Los Angeles
                                                                    ● Enter a city: [          ]

METHOD AND SYSTEM FOR EXTRACTING WEB QUERY INTERFACES

GOVERNMENTAL INTEREST

This invention was made with Government support under contract numbers IIS-0133199 and IIS-0313260 awarded by the national science foundation. The Government has certain rights in the invention.

FIELD OF THE INVENTION

The present invention relates generally to information researching and more particularly to web querying.

BACKGROUND OF THE INVENTION

The World Wide Web ("www" or "Web") continues to rapidly "deepen" by many searchable databases online, where data are hidden behind query forms. Unlike the surface Web providing link-based navigation, these "deep Web" sources support query-based access. Data are thus hidden behind their query interfaces. With the myriad databases online, at the order of $10^5$, the deep Web has clearly rendered large-scale integration a real necessity and a real challenge.

Guarding data behind them, such query interfaces serve as "entrances" to the deep Web. These interfaces, or HTML query forms, express query conditions for accessing objects from databases behind them. Other documents may also guard or provide access to data in an analogous manner. Each condition, in general, specifies an attribute, one or more supported operators (or modifiers), and a domain of allowed values. A condition is thus a three-tuple [attribute; operators; domain] e.g., $C_{author}$=[author;{"first name . . . ", "start . . . ", "exact name"}; text] in interface $Q_{am}$ (see, FIG. 3($a$)). Users can then use the condition to formulate a specific constraint e.g., [author="tom clancy"] by selecting an operator (e.g., "exact name") and filling in a value (e.g., "tom clancy").

For modeling and integrating Web databases, the first step is to "understand" what a query interface says—i.e., what query capabilities a source supports through its interface, in terms of specifiable conditions. For instance, amazon.com (FIG. 3($a$)) supports a set of five conditions: (on author, title, . . . , publisher). These query conditions establish the semantic model underlying the Web query interface. According to an aspect of the present invention, one may extract such form semantics.

Automatic capability extraction is critical for large-scale integration. Any mediation task generally relies on such source descriptions that characterize sources. Such descriptions, largely constructed by hands today, have been identified as a major obstacle to scale up integration scenarios. For massive and ever-changing sources on the Web, automatic capability extraction is essential for many tasks: e.g., to model Web databases by their interfaces, to classify or cluster query interfaces, to match query interfaces or to build unified query interfaces.

Such form understanding essentially requires both grouping elements hierarchically and tagging their semantic roles: first, grouping associates semantically related HTML elements into one construct. For instance, $C_{author}$ in $Q_{am}$ is a group of 8 elements: a text "author", a textbox, three radio buttons and their associated texts. Such grouping is hierarchical with nested subgroups (e.g., each radio button is first associated with the text to its right, before further grouping). Second tagging assigns the semantic roles to each element (e.g., in $C_{author}$, "author" has the role of an attribute, and the textbox an input domain.)

Such extraction is challenging, since query forms are often created autonomously. This task seems to be rather "heuristic" in nature, with no clear criteria but only a few fuzzy heuristics as well as exceptions. First, grouping is hard, because a condition is generally n-ary, with various numbers of elements nested in different ways. ([heuristics]: Pair closest elements by spatial proximity. [exception]: Grouping is often not pairwise.) Second, tagging is also hard, as there is no semantic labeling in HTML forms. ([heuristics]: A text element closest to a textbox field is its attribute. [exception]: Such an element can instead be an operator of this or next field.) Finally, with various form designs, their extraction can be inherently confusing—The infamous Florida "butterfly" ballots in US Election 2000 indicate that ill-designed "forms" can be difficult, even for human voters, to simply associate candidates with their punch holes. This incident in fact generated discussions on Web-form designs.

SUMMARY OF THE INVENTION

A computer program product being embodied on a computer readable medium for extracting semantic information about a plurality of documents being accessible via a computer network, the computer program product including computer-executable instructions for: generating a plurality of tokens from at least one of the documents, each token being indicative of a displayed item and a corresponding position; and, constructing at least one parse tree indicative of a semantic structure of the at least one document from the tokens dependently upon a grammar being indicative of presentation conventions.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which:

FIG. 1 illustrates a hidden-syntax hypothesis according to an aspect of the present invention;

FIG. 2 illustrates a form extractor for web query interfaces according to an aspect of the present invention FIG. 3 illustrates query interface examples according to an aspect of the present invention;

FIG. 4 illustrates data for a query vocabulary using condition patterns as building blocks for query interfaces hypothesis according to an aspect of the present invention;

FIG. 5 illustrates tokens T in a fragment of interface $Q_{am}$ according to an aspect of the present invention;

FIG. 6 illustrates productions of a 2P grammar according to an aspect of the present invention;

FIG. 7 illustrates two interpretations for text $s_1$ according to an aspect of the present invention;

FIG. 8 illustrates two interpretations for a radio button list according to an aspect of the present invention;

FIG. 9 illustrates two parse trees for interface Q1 according to an aspect of the present invention;

FIG. 10 illustrates fix-point processing according to an aspect of the present invention;

FIG. 11 illustrates a parser for a 2P grammar according to an aspect of the present invention;

FIG. 12 illustrates a 2P schedule graph for a grammar G according to an aspect of the present invention;

FIG. 13 illustrates a transformation of an r-edge according to an aspect of the present invention;

FIG. 14 illustrates partial trees for an interface $Q_{aa}$ fragment according to an aspect of the present invention;

FIG. 15 illustrates data indicative of precision and recall for a system according to an aspect of the present invention;

FIG. 16 illustrates exemplary patterns according to an aspect of the present invention; and, FIGS. 17A-17C illustrate an exemplary operation of a parser according to an aspect of the present invention.

DETAILED DESCRIPTION OF THE INVENTION

Figure 17A:
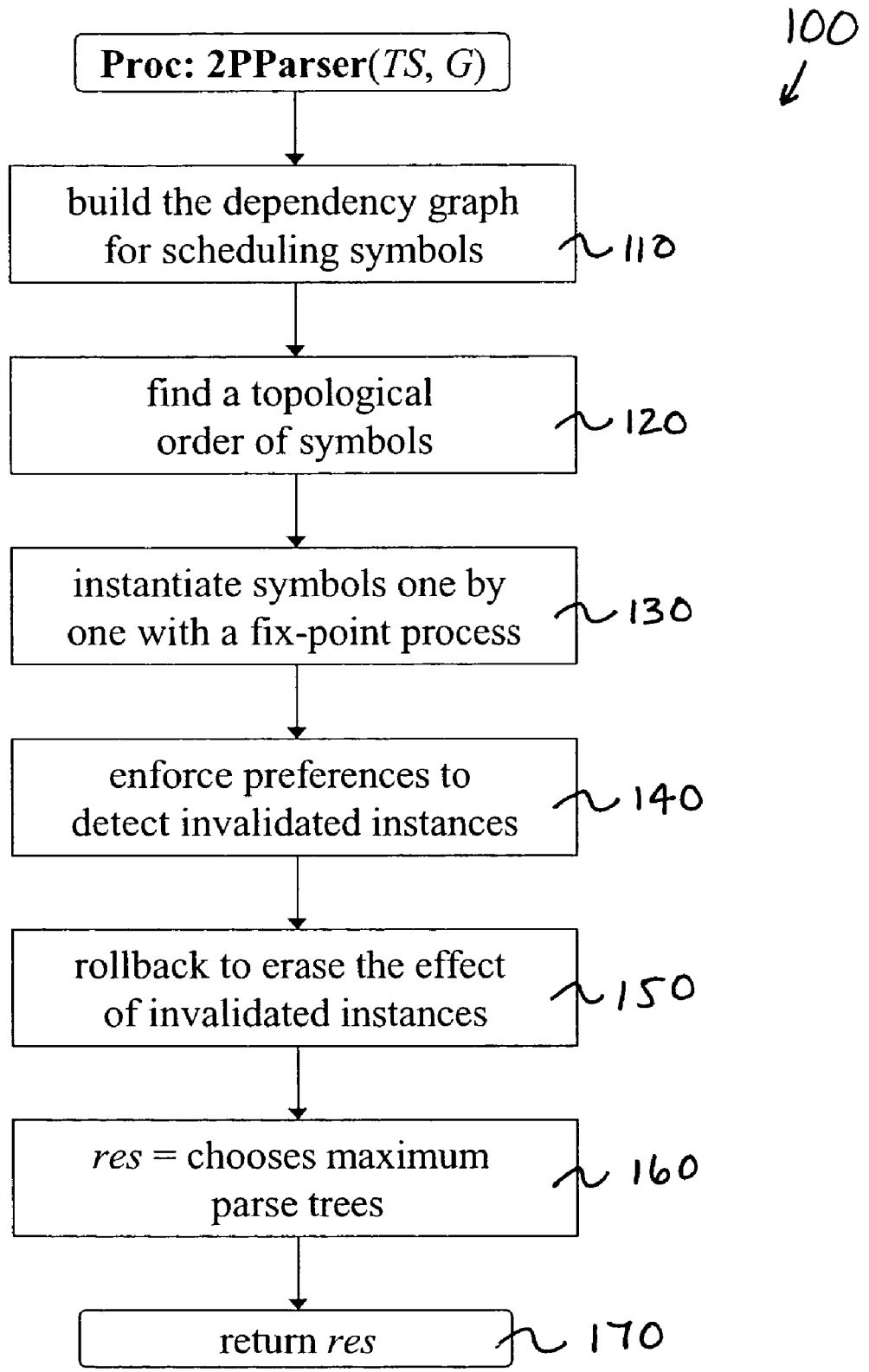

It is to be understood that the figures and descriptions of the present invention have been simplified to illustrate elements that are relevant for a clear understanding of the present invention, while eliminating, for purposes of clarity, many other elements found in typical querying methods and systems. However, because such elements are well known in the art, and because they do not facilitate a better understanding of the present invention, a discussion of such elements is not provided herein. The disclosure herein is directed to all such variations and modifications known to those skilled in the art.

According to an aspect of the present invention, an approach that builds on the observation that, across myriad sources, query forms seem to reveal some "concerted structure," by sharing common building blocks may be used. Toward this insight, one may hypothesize the existence of a hidden syntax that guides the creation of query interfaces, albeit from different sources. This hypothesis effectively transforms query interfaces into a visual language with a non-prescribed grammar and, thus, their semantic understanding a parsing problem. Such a paradigm enables principled solutions for both declaratively representing common patterns, by a derived grammar, and systematically interpreting query forms, by a global parsing mechanism. To realize this paradigm, one may address the challenges of a hypothetical syntax, that it is to be derived, and that it is secondary to the input. As the heart of a form extractor, one may use a 2P grammar and a best-effort parser, which together realize a parsing mechanism for a hypothetical syntax. According to an aspect of the present invention, it is believed that one may achieve above an 85% accuracy for extracting query conditions across random sources.

As query interfaces are created autonomously, automatic extraction of form semantics is clearly challenging. There seems to be some common "patterns" emerging from heterogeneous query forms. This impression suggests that Web forms are not entirely chaotic (which, if so, would render automatic extraction unlikely). Considering these patterns as the building blocks, or vocabulary, for constructing query forms, one may ascertain this vocabulary. Using search engines (e.g., google.com) and Web directories (e.g., invisibleweb.com), 150 sources were collected, which serves as a Basic dataset, with 50 in each of Books, Automobiles, and Airfares domains. These sources include familiar ones, e.g., amazon.com and aa.com as shown in FIG. 3. These domains were chosen as they are schematically dissimilar and semantically unrelated, and thus constitute a diverse "sample" of Web sources.

The survey established that query interfaces reveal some concerted structure: such that about 25 condition patterns may be suitable for use, which is surprisingly small as a vocabulary for online queries. Exemplary patterns are illustrated in FIG. 16.

FIG. 4(a) summarizes the occurrences of 21 "more-than-once" patterns. The figure marks (x, y) with a "+" if pattern y occurs in source x. As more sources are seen (along the x-axis), the growth (along y) of the vocabulary slows down and thus the curve flattens rapidly. Further, one may observe that the convergence generally spans across different domains (e.g., Automobiles and Airfares are mostly reusing the patterns from Books), which indicates that most condition patterns are quite generic and not domain specific.

One may also observe that the distribution is extremely non-uniform: FIG. 4(b) ranks these 21 patterns according to their frequencies, for each domain and overall. A characteristic Zipf-distribution may be observed, which means that a small set of top-ranked patterns is very frequently used.

Accordingly, according to an aspect of the present invention, one may imply that the small and converging vocabulary, which occurs across autonomous sources and even across diverse domains, indicates that there are conventions (or "design patterns") emerging among Web query forms. While each form is different, together they share a relatively small set of vocabulary. Further, the non-uniform distribution of patterns suggests that, to leverage such conventions, even if one can not exhaustively cover all patterns, a few frequent ones will likely pay off significantly.

The concerted-structure illustrates that form understanding can be promising, by leveraging presentation conventions. Intuitively, given a query form, one may thus build an understanding of it by decomposing it into some known patterns, each of which has been seen before. Thus, an interpretation of an interface unseen before may be assembled of known patterns. This "divide-and-conquer" approach allows a small vocabulary of such patterns to be shared across diverse query forms.

To use these layout patterns, it may be tempting to "simply" code up each pattern as a rule-of-thumb, e.g., the pairwise-proximity grouping heuristic. However, to specify these patterns, such procedural description will involve convoluted code, lacking both generality and extensibility. Further, to recognize these patterns, it is far from clear, beyond individual heuristics, how they together form a coherent interpretation of the query form.

Accordingly, a hidden syntax behind Web query interfaces, across different sources, may be leveraged. This rationalizes the observed concerted structure. As FIG. 1 illustrates, a query form creation as guided by such a hypothetical syntax, which connects semantics (i.e., query conditions) to presentations (i.e., query forms) may be used. Such a hidden syntax represents the presentation conventions across Web forms. Unlike traditional string languages (e.g., programming languages), this syntax uses visual effects to express the embedded semantics (e.g., pattern 1 in FIG. 3(c) arranges the attribute to be left-adjacent and bottom-aligned to the input field).

Thus, a new paradigm is brought forward: viewing query interfaces as a formal language, and in particular, a visual language, whose composition conforms to a hidden, i.e., non-prescribed, grammar. Their semantic understanding, as the inverse, is thus a parsing problem. This "language" paradigm further enables a principled algorithmic framework for form understanding—a task that appears inherently heuristic at first. By the hidden-syntax hypothesis, one may resort to a formal framework for languages. That is, according to an aspect of the present invention, the dual notions of a grammar and a parser together provide a systematic framework for both specifying and recognizing common patterns.

For pattern specification, the grammar provides a declarative mechanism. Such patterns (e.g., FIG. 3(c)) may simply be declared by productions (i.e., grammar rules) that encode associated visual characteristics. The specification of patterns is thus declarative, fully separated from and independent of how they are recognized individually and assembled globally by the parser. By incorporating arbitrary spatial relations (instead of, say, only proximity), one can describe complex visual patterns. By building productions upon productions, one can describe patterns of different "orders." One may also simply augment the grammar to add new patterns, leaving the parsing untouched.

For pattern recognition, the parser provides a global mechanism for systematically constructing a parse tree as a coherent interpretation of the entire query interface. Such a parse naturally structures elements in nested sub-trees, thus satisfying the grouping requirement. Further, it assigns grammatical alphabet symbols (terminals and non-terminals) to each construct, thus satisfying the tagging requirement. Finally, it should be noted that such parsing leverages not only individual patterns but also their coherent assembly into an entire query form, thus resolving local conflicts by a global context. Parsing thus systematically realizes the intuitive "divide-and-conquer" approach.

As the hidden syntax enables a new paradigm, it may present new challenges. For example, as this hypothetical nature implies, the grammar is non-prescribed. That is, instead of being prescribed before query forms are created, it is simply derived from whatever conventions naturally emerge. Further, the grammar may be secondary to any language instance. That is, instead of dictating form creation, it may rely on the language's natural convergence to derive any convention. Thus, first, for capturing the hypothetical syntax, the grammar may represent "conventions" used for Web form presentation. Further, while one may ideally want to capture all patterns across many forms, unlike in a carefully-orchestrated grammar, these patterns may not be mutually "compatible." One may thus rethink the right mechanism for such a derived grammar, to capture necessary conventions for enabling parsing. Second, a derived grammar may be inherently incomplete (with uncaptured patterns) and ambiguous (with conflicting patterns). Thus, such a grammar may only be secondary to input. Further, unlike traditional parsing, a parser according to the present invention may not reject input query forms, even if not fully parsed, as "illegal." That is, the parser may no longer "police" a language for checking and enforcing grammar rules. It may instead be a "soft" parser that accepts any input. The right semantics for such a soft parser, and further, its realization should thus be accordingly derived.

According to an aspect of the present invention, one may build upon the traditional language framework. First, as a derived grammar for capturing the hypothetical syntax, the 2P grammar encodes not only "patterns" but also their "precedence." Second, as a soft-parser directed by a hypothetical syntax, when a single perfect parse does not exist, the best-effort parser resolves ambiguities as much as possible and constructs parse trees as large as possible.

To capture the hidden syntax, a grammar may be used to encode two complementary types of presentation conventions. On one hand, ideally all conventional patterns are captured. On the other hand, however, by capturing many patterns, some will conflict, and thus a conventional precedence (or "priorities") may also be captured.

The grammar mechanism may encode both conventions by productions and preferences respectively (and thus the 2P name). That is, it may capture knowledge for both pattern construction (by productions) and ambiguity resolution (by preferences). According to an aspect of the present invention a 2P grammar may take the form of a 5-tuple $(\Sigma, N, s, P_d, P_f)$, where $\Sigma$ is a set of terminal symbols, N is a set of nonterminal symbols, $s \in N$ is a start symbol, $P_d$ is a set of production rules, and $P_f$ is a set of preference rules. This 2P grammar mechanism may be used to express the hypothetical syntax. Such a grammar may be derived from analyzing and abstracting common patterns.

In turn, a best-effort parser works with the hypothetical syntax. As explained earlier, a derived grammar will be inherently ambiguous and incomplete. A "soft parser" that assembles parse trees that may be multiple (because of ambiguities) and partial (because of incompleteness), instead of insisting on a single perfect parse may be used. First, it may prune ambiguities, as much (and as early) as possible, by employing preferences (as in the 2P grammar). Second, it may recognize the structure (by applying productions) of the input form, as much as possible, by maximizing partial results.

In general, a form extractor may be built in a language-parsing framework. Given an input HTML query form, the form extractor outputs its semantic model (or the query capabilities) of the form. At the heart, the best effort parser may work with a derived 2P-grammar to construct multiple and partial parse trees. As preprocessing, a tokenizer may prepare the input to the core parser, by converting the input HTML form into a set of basic tokens, which are the atomic units in the visual grammatical composition. As post-processing, the merger integrates the output of the parser to generate the final semantic model.

More particularly, at the front-end, the tokenizer converts an HTML query form (in a Web page) into a set of tokens, each representing an atomic visual element on the form. These tokens are instances of the terminals $\Sigma$ as the 2P grammar defines. Each token thus has a terminal type and some attributes recording properties necessary for parsing. For instance, given the HTML fragment (as part of interface $Q_{aa}$), as shown in FIG. 5, the tokenizer extracts a set T of 16 tokens. In particular, token so is a text terminal, with attributes sval="Author" (its string value) and pos=(10, 40, 10, 20) (its bounding-box coordinates). Although different terminals have different attributes, this pos attribute is universal, as the grammar captures two dimensional layout. Such a tokenizer thus essentially builds on a layout engine for rendering HTML into its visual presentation. In particular, the tokenizer may use the HTML Document Object Model (DOM) API (available in browsers, e.g., Internet Explorer), which provides access to HTML tags and their positions.

At the back-end, the merger combines the multiple partial parse trees that the parser outputs, to compile the semantic model and report potential errors (if any). Since the parser is rather generic, this step applies application (i.e., query form) specific processing. First, as the goal is to identify all the query conditions, the merger combines multiple parse trees by taking the union of their extracted conditions. As each parse covers different parts of the form, this union enhances the coverage of the final model constructed. For example, given a fragment of interface $Q_{aa}$, as FIG. 14 shows, the parser will generate three partial parses (trees 2, 3, 4 in the figure). Their union covers the entire interface and generates all the conditions.

The merger also reports errors, which are useful for further error handling by a "client" of the form extractor. Two types of errors may be reported. First, a conflict occurs if the same token is used by different conditions. In FIG. 14, tree 2 associates the number selection list with number of passengers, while tree 3 with adults, and thus they conflict by competing for the number selection. (In this case, tree 3 is the correct association.) Second, a missing element is a token not covered by any parse tree. The merger reports both types of errors for further client-side handling.

As the key component in the parsing framework, the 2P grammar captures presentation conventions of Web interfaces. Specifically, the 2P grammar declaratively and comprehensively specifies both condition patterns and their precedence, as a principled way to express a derived syntax and to resolve potential ambiguities. In particular, productions formally specify common condition patterns and preferences their relative precedence.

Since the condition patterns establish a small set of building blocks for Web interfaces, appropriate presentational characteristics to capture those condition patterns as productions may be used. In particular, in query interfaces, visual effects such as topology (e.g., alignment, adjacency) and proximity (e.g., closeness) are frequently used for expressing semantically related components and thus are the candidates to be captured by productions. Some features, such as proximity, work well for simple interfaces. However, it may be difficult to extend this to complex interfaces, which difficulty can often result in incorrect interpretations. On the other hand, topology features such as alignment and adjacency (e.g., left, above) often accurately indicate the semantic relationships among the components in query interfaces. According to an aspect of the present invention, topological information may be analyzed in the productions, to capture condition patterns.

Two-dimensional grammars have been proposed in visual languages to realize such specifications of visual patterns, e.g., relational grammar, constraint multiset grammar, positional grammar. The 2P grammar (without considering the preferences) may be considered a special instance of attributed multiset grammar, where a set of spatial relations capturing topological information (e.g., left, right) are used in productions.

The main extension of two dimensional grammars from string grammars (e.g., for programming languages) is to support general constraints. In two dimensional grammars, productions need to capture spatial relations, which essentially are constraints to be verified on the constructs. For example, consider production P5 in FIG. 6. To capture the pattern TextOp (used by author in interface $Q_{aa}$), Attr may be specified as being left to Val and Op below to Val. (Note that, in the 2P Grammar, adjacency may be implied in all spatial relations and thus omitted in the constraint names). In contrast, productions in string grammars only use one constraint, the sequentiality among components.

As a consequence, such extension leads to adaptations in other aspects of the productions. Specifically, to support the general constraints, each symbol has a set of attributes (e.g., pos of Attr, Op and Val), which stores the information used in constraints evaluation (e.g., left, below). Further, each production has a constructor, which defines how to instantiate an instance of the head symbol from the components. For example, after applying the production P5 to generate a new TextOp instance I, the constructor computes I's position from its components. Formally, we define the production as: A production P in a 2P grammar G=($\Sigma$, N, s, Pd, Pf) is a four-tuple (H, M, C, F): Head H$\in$N is a nonterminal symbol; Components M$\subseteq$$\Sigma$$\cup$N is a multiset of symbols; Constraint C is a Boolean expression defined on M; and Constructor F is a function defined on M, returning an instance of H.

Referring now to FIG. 6, there is shown an Example 1, wherein grammar G that specifies 11 productions labeled from P1 to P11. Each production defines a non-terminal (e.g., TextOp and EnumRB) as its head. The start symbol is QI and the terminal symbols are text, textbox and radiobutton. Note that, to simplify the illustration, the production constructors have been omitted in FIG. 6.

Productions P3 to P11 capture three patterns (patterns 1 and 2 in FIG. 3(c) in addition to TextOp introduced above). Productions P1 and P2 capture the form pattern by which condition patterns are arranged into query interfaces. In particular, we consider a query interface QI as composing of vertically aligned "rows" HQI, where each HQI further composes of horizontally aligned condition patterns CP.

As will be understood by those possessing an ordinary skill in the pertinent arts, productions provide a general and extensible mechanism for describing patterns. First, it can express patterns of different "orders": such that complex patterns are built upon simpler ones. For example, pattern TextOp is constructed from simpler patterns Attr, Op and Val, and in turn serves as the basis of higher order patterns such as QI. Second, being extensible, it may incorporate new patterns and new constraints, while leaving the parsing algorithm untouched. As is discussed below, by changing the grammar, exactly the same parsing framework can be used for other applications.

For derived grammars, precedence may be used to resolve conflicts among patterns, and thus form an integral component of the 2P grammar. While the grammar may capture as many common (but non-prescribed) patterns as possible, those patterns may not be "compatible," which results in significant ambiguities. To resolve those ambiguities, a preference framework which captures the conventional precedence among condition patterns may be used.

Again, an ambiguity results when there exist multiple interpretations for the same token, and therefore these interpretations conflict on such a token. As Example 2, to capture the condition pattern TextVal used by from condition in $Q_{aa}$ and pattern RBU used in $Q_{am}$, one may define productions P4 and P9 respectively. However, such generality brings ambiguities, allowing a token to be interpreted differently by different patterns. Consider the text token $s_1$ (i.e., "first name/initial and last name") in FIG. 5, pattern TextVal(P4) and RBU(P9) have different interpretations on $s_1$, as FIG. 7 shows. In particular, TextVal interprets it as an Attr instance A1 in a TextVal instance I1 (FIG. 7(a)). In contrast, RBU interprets it as the text of a RBU instance I2 (FIG. 7(b)). Since conflicting on $s_1$, I1 and I2 cannot appear in the same parse tree.

Thus, the existence of ambiguities may cause parsing inefficient and inaccurate. It is inefficient because of local ambiguities. That is, the parser may generate "temporary instances" that will not appear in any complete parse tree. An ambiguity first name/initials and last name Instance between two instances is local if at least one of them is a temporary instance. Again considering the above example 2, I1 is a temporary instance, since we cannot further derive a complete parse tree from I1. In contrast, we can derive complete parse trees from I2 (as FIG. 9 shows two). Hence, such an ambiguity is local because it can eventually be resolved at the end of parsing. According to an aspect of the present invention, the parser may generally follow a bottom-up exhaustive approach, which explores all possible interpretations. Therefore, the existence of local ambiguities may make parsing very inefficient due to the generation of many "temporary instances."

In contrast, global ambiguities make the parsing results inaccurate. That is, the parsing may generate more parse trees than the semantically correct one. An ambiguity between two instances is global if they lead into different parse trees, and thus cannot be resolved even at the end of parsing.

As Example 3, to capture radio button lists of arbitrary length, production P8 is defined in a recursive way. As a result, a radio button list of length three can have four interpretations, depending on how they are grouped. FIG. 8 shows such two—(a) as a single list or (b) as three individual lists with each of length one. The ambiguity between these two interpretations is global, because they eventually lead to two different parse trees, as FIG. 9 shows. The first one takes the entire list as an operator of author, while the second takes each list (of length 1) as a condition pattern EnumRB.

The effect of the inherent ambiguities may be significant. For instance, the simple query interface in FIG. 5 has one correct parse tree containing 42 instances (26 non-terminals and 16 terminals). However, applying a basic parsing approach that exhausts all possible interpretations by "brute-force," 25 parse trees and 773 instances (645 temporary instances and 128 non temporary ones) may be deduced. Conflicting instances may further participate in generating other instances, which in turn conflict, thus causing such a significant misinterpretation. Such exponential aggregation makes ambiguity a significant problem in parsing.

To resolve the significant ambiguities among condition patterns, one may prioritize patterns of a derived grammar. The derived nature of our hidden syntax implies that such precedence comes from "hidden priority conventions" across patterns. In predefined grammars, the creation of a grammar is prior to that of the corresponding language, therefore how to resolve ambiguity is determined apriori. However, in derived grammars, the precedence itself is part of conventions to be derived from the language, and thus cannot be arbitrarily decided. According to an aspect of the present invention, one may use the preference to encode conventional precedence across patterns.

By way of Example 4, there are two conflicting instances, A1 and I2 in the above Example 2. One may observe that text and its preceding radio button are usually tightly bounded together, therefore when conflicting, I2 is more likely to have a higher priority than A1. Such convention of the precedence between patterns may be used to resolve ambiguities. In particular, a precedence convention may be encoded as a "preference" RI: when an RBU instance and an Attr instance conflict on a text token, we arbitrate unconditionally the former as the winner.

In general, a convention may also carry a criterion for picking the winner. For example, for the ambiguity described above, one may observe that a row of radio buttons is usually used as a single longer list rather than separate shorter ones. Therefore, we define a preference R2: when two RBList instances conflict, and if one subsumes the other, pick the longer one as the winner.

Specifically, each preference resolves a particular ambiguity between two types of conflicting instances by giving priority to one over the other. As the above example motivates, such a preference needs to specify the situation and the resolution. The situation indicates the type of conflicting instances (e.g., RBList in preference R2) and the conflicting condition (e.g., subsume). The resolution describes the criteria that the winner instance should satisfy (e.g., longer).

Formally, the preference may be defined as: a Preference R in a 2P grammar G=(Σ, N, s, Pd, Pf) is a three-tuple <I, U, W>: Conflicting instances I=<v1:A, v2:B>, where A,B∈N∪Σ, identifies the types of instances v1 and v2 respectively. Conflicting condition U is a Boolean expression on v1, v2 that specifies a conflicting situation to be handled. Winning criteria W is a Boolean expression on v1, v2 that specifies the criteria to pick v1 as the winner.

With 2P grammar capturing the conventions of condition patterns and their preferences, a best-effort parsing algorithm that on one hand makes use of preferences to prune the wrong interpretations in a timely fashion, and on the other hand handles partial results to achieve maximum interpretations for the input may be employed.

With potential ambiguities and incompleteness, the best effort parser operates on a basic framework, the fix-point evaluation as described in R. Helm, K. Marriott, and M. Odersky, Building visual language parsers, In Proceedings on Human Factors in Computing Systems (CHI), pages 105-112, 1991, that progressively and concurrently develops multiple parse trees. The essential idea is to continuously generate new instances by applying productions until reaching a fix-point when no new instance can be generated. For example, as FIG. 10 conceptually shows, the parser starts from a set of tokens T (FIG. 5), iteratively constructs new instances and finally outputs parse trees. In particular, by applying the production P9, one may generate an RBU instance from the text token $s_1$ and radiobutton $r_1$. Further, with the production P8, the RBUs in a row together generate an RBList instance. Continuing this process, one may eventually reach the fix-point. A complete parse tree corresponds to a unique instance of the start symbol QI that covers all tokens, as FIG. 10 conceptually shows one. However, due to the potential ambiguities and incompleteness, the parser may not derive any complete parse tree and only end up with multiple partial parse trees.

Upon this framework, we realize the "best-effort" philosophy using: (1) just-in-time pruning to prune the parse trees with wrong interpretations as much and as early as possible; and, (2) partial tree maximization to favor the parse trees that interpret an input as much as possible. FIG. 11 shows an embodiment of a best-effort parsing algorithm 2PParser. Corresponding to the above two components, the algorithm has two phases: first, parse construction with just-in-time pruning, and second, partial tree maximization at the end of parsing. To achieve just-in-time pruning, we schedule the symbols (by procedure BidSchdGraph, explained below) in a proper order so that false instances are pruned timely before further causing more ambiguities. According to the scheduled order, we instantiate the symbols one by one with a fixed point process (by instantiate). Preferences are enforced at the end of each iteration (by enforce) to detect and remove the false instances in this round. When an instance is invalidated, we need to erase its negative effect: false instances may participate in further instantiations and in turn generate more false parents. Procedure rollback is used to remove all those false ancestors to avoid further ambiguity aggregation. Finally, after parse construction phase, PRHandler chooses the maximum parse trees generated in the parse construction phase and outputs them.

Figure 17B:
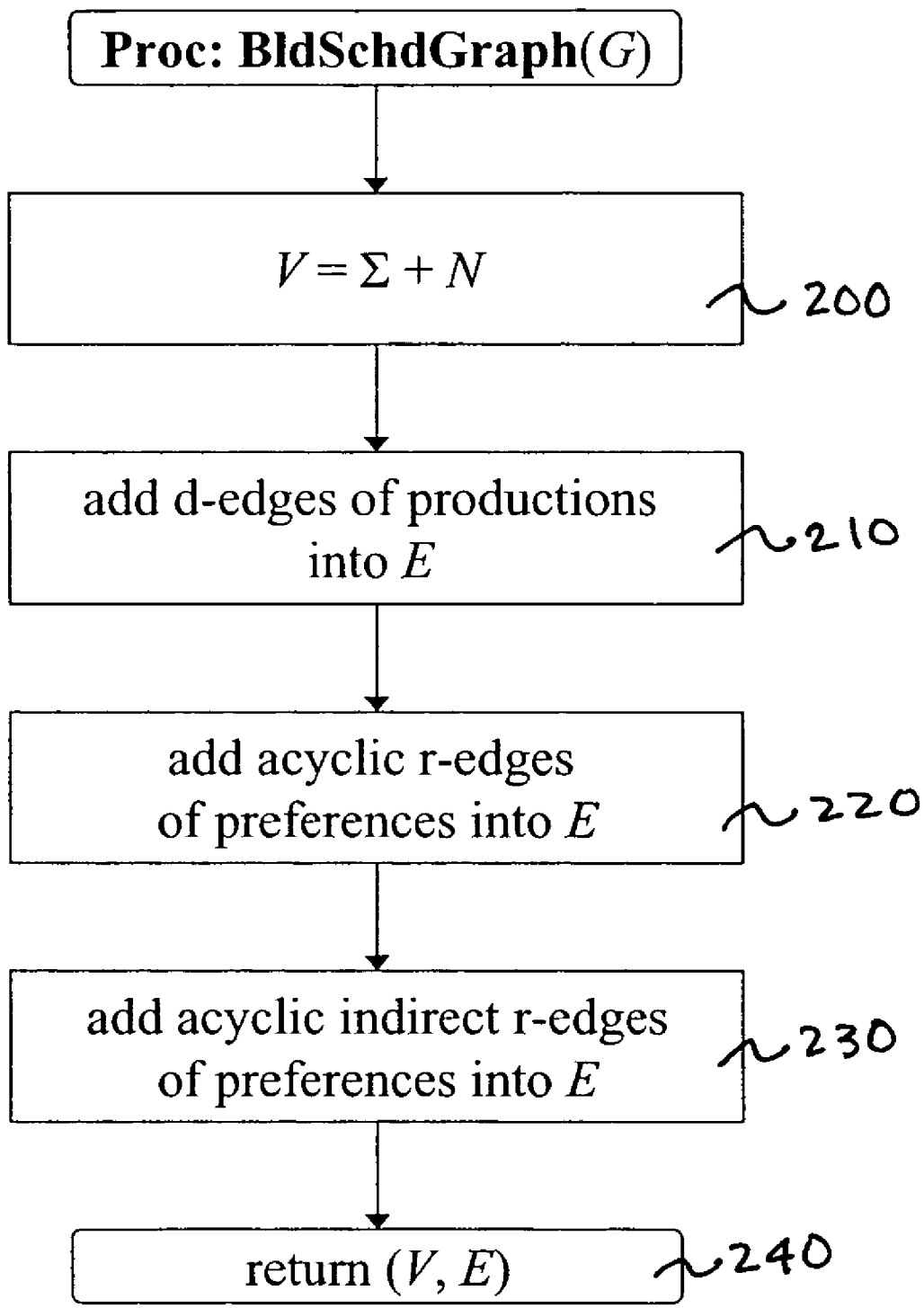
Figure 17C:
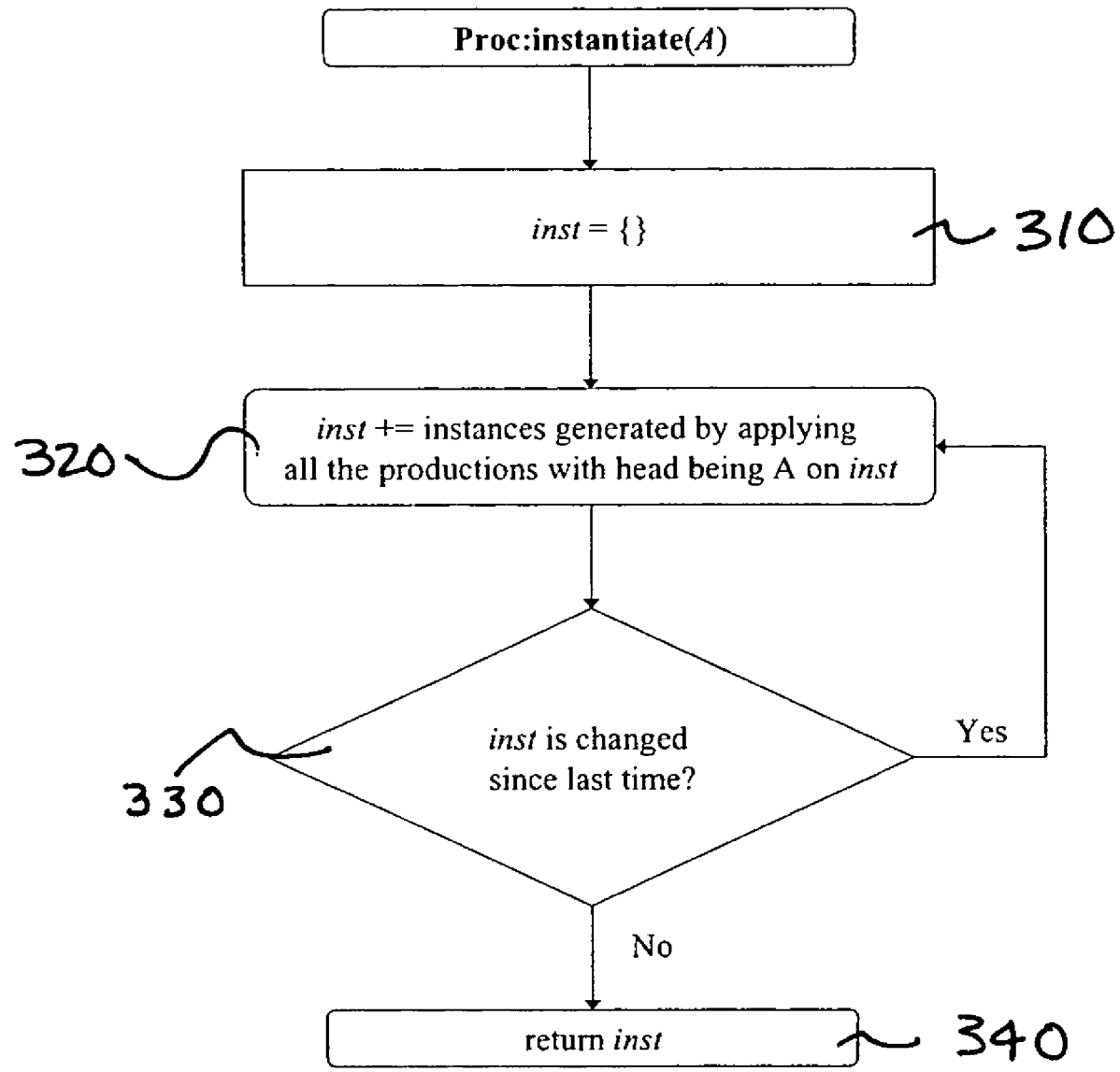

For example, and referring now to FIGS. 17A-17C collectively, there is shown an exemplary flow diagram 100 for a parser according to an aspect of the present invention. The parser first builds a dependency graph for scheduling symbols 110. The parser then finds a topological order for the symbols 120. The parser then instantiates the symbols, one-by-one, with a fix-point process 130. Preferences may then be enforced to detect invalidated instances 140. If necessary, a rollback may be performed to remove the effects of invalidated instances 150. The maximum parse tree may then be selected as the result 160, and returned 170. Process BldSchdGraph may proceed along the lines of FIG. 17B. For example, the value of V may be set according to V=Σ+N at step 200. The d-edges of productions may then be added into E 210. The acrylic r-edges of preferences may then be added 220. The acrylic indirect r-edges of preferences may then be added 230. Finally (V, E) may be returned 240. Turning now to FIG. 17C, process instantiate may proceed along the lines shown there in. For example, an initial result may be instantiated 310. All of the productions, with a proper head of the list may then be used to generate instances 320. It may then be determined if the instantiation has changed 330. If so, step 320 may be repeated. If not, the result may be returned 340.

The complexity of the membership problem (i.e., given grammar G, a sentence S, to determine whether S∈L(G)) for visual languages is NP-complete. The algorithm may thus run in exponential time with respect to the number of tokens. However, in practice, the use of preferences gives reasonably good performance. Given a query interface of size about 25 (number of tokens), parsing takes about 1 second. Parsing 120 query interfaces with average size 22 takes less than 100 seconds. (The time measured here only includes the parsing time without tokenization and merger.)

To prune false instances as much and as early as possible, a good timing may be used for enforcing the preferences. Such timing would guarantee that any false instance is removed before participating in further instantiations, therefore no rollback is necessary. However, applying preferences whenever a new instance is generated in the basic fix-point algorithm cannot achieve so.

For example (Example 5), with the preference R1 (defined in Example 4) which resolves the local ambiguity in Example 2, the Attr instance A1 should be removed by the RBU instance I2. But, what if A1 is generated at the very beginning of parsing, while I2 is generated at the end? A1 will still instantiate instance I1 (and possibly others), and only be removed at the end of parsing (when I2 is generated). This "late pruning" makes the preference RI ineffective in controlling ambiguity aggregation.

To address the problem, one may generate the winner instance (e.g., I2) before the loser (e.g., A1) so that the loser can be detected and pruned whenever it is generated. Essentially, one may schedule the instance generation in some desired order consistent with the preferences. As preferences are defined on symbols, to guarantee the order on particular instances, one may enforce such an order on symbols so that the winner symbol produces all its instances before the loser does. Therefore, such symbol-by-symbol instantiation and winner-then-loser order can guarantee that instances are produced in a desired order to ensure just-in-time pruning.

To realize the symbol-by-symbol instantiation, the symbols may be processed in a "children-parent" direction defined by the productions. For example, consider symbol TextOp, as the production P5 defines, the symbols that contribute to the instantiation of TextOp are Aftr, Op and Val. Before one processes TextOp, those children symbols may be processed first. Further, to realize the winner-then-loser order, the winner symbol (e.g., RBU in Example 5) may be scheduled before the loser (e.g., Attr).

To schedule the symbols by the above two orders, one may build a 2P schedule graph. The graph consists of the symbols as nodes and two types of edges—d-edges to capture the "children-parent" order defined by the productions and r-edges to capture the winner-then-loser order defined by the preferences.

For example, (Example 6), FIG. 12(c) shows the 2P schedule graph Y for the Grammar G (defined in Example 1), by merging d-edges (FIG. 12(a)) and r-edges (FIG. 12(b)). Y has a d-edge A→B if the grammar has a production with head symbol A and component symbols containing B (i.e., A is a parent of B). Y has an r-edge C→D if the grammar has a preference D over C (i.e., D is the winner and C is the loser). One may omit the self-cycles because they do not affect the scheduling. (More precisely, one may also omit the terminals, as they do not affect the schedule-ability in this example.) By merging these two types of edges, you get the 2P schedule graph Y, with solid edges denoting d-edges and dashed r-edges.

By enforcing a topological order on symbol instantiations, this 2P schedule graph captures the two requirements needed for just-in-time pruning. If the graph is acyclic, any topological order achieves such a goal. For example, as our schedule graph Y (Example 6) is acyclic, we schedule RBU before Attr. Thus, instance I2 is generated before A1, which then is pruned promptly when generated. More precisely, as preferences are enforced at the end of each symbol instantiation to avoid repeated calls for every instance, ambiguities may aggregate during the instantiation of the symbol, which is minimal.

While just-in-time pruning addresses the inherent ambiguities of the grammar, partial parse trees still need to be handled. The parsing algorithm generates partial parse trees when the grammar is incomplete to interpret the entire query interface.

Specifically, partial parse trees are the derivation trees that cover a subset of tokens and can not be expanded further. For instance, when a query interface contains new condition patterns not covered by the 2P grammar, the parse construction will stop at those partial trees, since not being able to further assemble more tokens. For example, consider the query interface in FIG. 14, which is a variation from the interface $Q_{aa}$. Grammar G does not completely capture the form patterns of that interface. The lower part is arranged "column by column" instead of "row by row." Therefore, the parse construction generates only partial parses, as FIG. 14 shows four of them.

To maximize the understanding of query interfaces, the parser may favor the maximum partial trees that interpret as many tokens as possible. In particular, a maximum subsumption may be used to choose parse trees that assemble a maximum set of tokens not subsumed by any other parse. For example, Tree 1 in FIG. 14 is not maximum because the tokens covered by Tree 1 is subsumed by those of Tree 2. The other three, although overlapping, do not subsume each other. A complete parse tree is a special case of maximum partial tree. In addition to maximizing the interpretations, such maximum parse trees also potentially achieve better interpretations, since they are looking at larger context compared with the non-maximum ones.

What is claimed is:

1. A computer readable storage medium encoded with a computer program to be executed by a computer for extracting semantic information about a plurality of documents autonomously created by different sources and being accessible via a computer network, said computer readable storage medium comprising:

a tokenizer for causing the computer to generate a set of tokens indicative of document object model (DOM) nodes associated with visual information in a displayed document image from one of the plurality of autonomously created documents;

a grammar mechanism for causing the computer to derive a non-prescribed visual grammar from the set of tokens to represent a hidden syntax convention of a visual presentation; and a best-effort parser for causing the computer to apply the derived visual grammar to construct multiple parse trees that represent semantic structure of the document and interpret a maximum subset of the set of tokens, wherein said non-prescribed visual grammar is derived from a plurality of autonomously created or heterogeneous Web documents to represent the hidden syntax convention of the visual presentation common among the plurality of autonomously created or heterogeneous Web documents; and said grammar is a five tuple <Σ, N, s, Pd, Pf> where Σ is a set of terminal symbols, N is a set of nonterminal symbols, s∈N is a start symbol, Pd is a set of production rules that represent visual patterns and Pf is a set of preference rules that represent pattern precedence.

2. The computer readable storage medium of claim 1, wherein said tokenizer for causing the computer to generate said set of tokens comprises computer executable instructions for:

receiving a document in a mark-up language;

rendering said document by a layout engine into a document image;

extracting tokens indicative of DOM nodes with visual properties in the rendered document image; and storing said tokens in a memory with visual properties.

3. The computer readable storage medium of claim 2, wherein said visual properties include, for each token, the coordinates of the token in the displayed document image, the value of the token, the DOM path of the token in the DOM tree, the type of the token, and the name of the token.

4. The computer readable storage medium of claim 1 wherein said hidden syntax convention of visual presentation is derived by performing the following steps:

observing the visual relationship of tokens on how they form semantic units, and deriving visual patterns to represent the semantic unit; and observing precedence between different conflicting patterns and deriving pattern preference to represent their precedence.

5. The computer readable storage medium of claim 1, wherein said production rules are a four tuple (H, M, C, F), where H∈N is the head of the production M⊆ΣUN is a multiset of symbols, C is a boolean constraint defined on M and F is a constructor defined on M.

6. The computer readable storage medium of claim 1, wherein said preference rules are a three tuple <I,U,W> where I identifies the types of conflicting instances, U defines a conflicting condition which said rule will handle, and W specifies the winning criteria to solve the conflict by picking one instance from the conflicting ones.

7. The computer readable storage medium of claim 6 wherein said best-effort parser causes the computer to perform a procedure comprising of the steps of:

building a schedule graph for determining the order of applying production rules;

building multiple parse trees simultaneously by grouping tokens using production rules in determined orders;

pruning useless parse trees by checking preference rules; and outputting multiple potential useful parse trees that maximally cover the tokens in the document.

8. The computer readable storage medium of claim 7 wherein the step of building a schedule graph comprises:

adding dependency edges from head symbol to each component symbol for each production rule;

adding restriction edges between two symbols for each preference rule;

transforming restriction edges when graph is acyclic; and removing restriction edges if graph is still acyclic after said transformation.

9. The computer readable storage medium of claim 7 wherein the step of building multiple parse trees compromises the steps of:

getting productions in the order determined by the schedule graph; and applying each production (H, M, C, F), in the identified order, to generate new instances of the head H, from the instances of the components M, by using the construction function F, if the components M satisfy constraint C.

10. The computer readable storage medium of claim 7, wherein the step of pruning useless parse trees compromises the steps of:

for each newly generated instance, checking the conflicting condition of all preference rules to find all conflicts with existing instances; and applying the winning criteria for conflict resolution to remove false instances.

11. The computer readable storage medium of claim 1, wherein said Web documents are Web query forms.

12. A method for extracting semantic information about a plurality of electronic documents autonomously created by different sources and being accessible via a computer network, comprising:

accessing an electronic document via the computer network;

generating a set of tokens by a computer, the tokens indicative of document object model (DOM) nodes associated with visual information in a displayed document image of the electronic document;

deriving a non-prescribed visual grammar from the set of tokens by the computer, to represent a hidden syntax convention of visual presentation in the displayed document image; and applying said derived visual grammar by the computer to construct multiple parse trees that represent semantic structure of the electronic document and interpret a maximum subset of the set of tokens, wherein said non-prescribed visual grammar is derived from autonomous or heterogeneous Web documents to represent the hidden syntax convention of the visual presentation, and said derived non-prescribed visual grammar is a five tuple <Σ, N, s, Pd, Pf> where Σ is a set of terminal symbols, N is a set of nonterminal symbols, s∈N is a start symbol, Pd is a set of production rules that represent visual patterns and Pf is a set of preference rules that represent pattern precedence.

13. The method of claim 12, wherein generating said set of tokens comprises:

receiving data representing a document in a mark-up language;

rendering said document by a layout engine into a document image;

extracting tokens indicative of DOM nodes with visual properties in the rendered document image; and storing said tokens in a memory with visual properties.

14. The method of claim 13, wherein said visual properties include for each token, the coordinates of the token in the displayed document image, the value of the token, the DOM path of the token in the DOM tree, the type of the token, and the name of the token.

15. The method of claim 12 wherein said hidden syntax convention of visual presentation is derived by performing the following steps:

observing the visual relationship of tokens on how they form semantic units, and deriving visual patterns to represent the semantic unit; and observing precedence between different conflicting patterns and derive pattern preference to represent their precedence.

16. The method of claim 12, wherein said production rules are a four tuple (H, M, C, F), where H∈N is the head of the production, M⊆ΣUN is a multiset of symbols, C is a boolean constraint defined on M and F is a constructor defined on M.

17. The method of claim 12, wherein said preference rules are a three tuple <I,U,W> where I identifies the types of conflicting instances, U defines a conflicting condition, which said rule will handle, and W specifies the winning criteria to solve the conflict by picking one instance from the conflicting ones.

18. The method of claim 17 wherein said step of applying said derived visual grammar to construct multiple parse trees that represent semantic structure of the document and interpret as many tokens as said derived visual grammar can comprises the additional steps of:
   building a schedule graph for determining the order of applying production rules;
   building multiple parse trees simultaneously by grouping tokens using production rules in determined orders;
   pruning useless parse trees by checking preference rules; and
   outputting multiple potential useful parse trees that maximally cover the tokens in the document.

19. The method of claim 18 wherein the step of building a schedule graph comprises:
   adding dependency edges from head symbol to each component symbol for each production rule;
   adding restriction edges between two symbols for each preference rule;
   transforming restriction edges when graph is acyclic; and
   removing restriction edges if graph is still acyclic after said transformation.

20. The method of claim 18 wherein the step of building multiple parse trees compromises the steps of:
   getting productions in the order determined by the schedule graph; and
   applying each production (H, M, C, F), in the identified order, to generate new instances of the head H, from the instances of the components M, by using the construction function F, if the components M satisfy constraint C.

21. The method of claim 18, wherein the step of pruning useless parse trees compromises the additional steps of:
   for each newly generated instance, checking the conflicting condition of all preference rules to find all conflicts with existing instances; and
   applying the winning criteria for conflict resolution to remove false instances.

22. The method of claim 12, wherein said Web documents are Web query forms.

23. A computer implemented system for extracting semantic information about a plurality of electronic documents autonomously created by different sources and being accessible via a computer network, comprising:
   a programmed computer including a tokenizer for generating a set of tokens indicative of document object model (DOM) nodes associated with visual information in a displayed document image from one of the plurality of autonomously created electronic documents accessed via the computer network;
   the programmed computer including a grammar mechanism for deriving a non-prescribed visual grammar from the set of tokens to represent a hidden syntax convention of a visual presentation; and
   the programmed computer including a best-effort parser for applying the derived visual grammar to construct multiple parse trees that represent semantic structure of the document and interpret a maximum subset of the set of tokens,
   wherein said non-prescribed visual grammar is derived from a plurality of autonomously created or heterogeneous Web documents to represent the hidden syntax convention of the visual presentation common among the plurality of autonomously created or heterogeneous Web documents, and
   said grammar is a five tuple <Σ, N, s, Pd, Pf> where Σ is a set of terminal symbols, N is a set of nonterminal symbols, s∈N is a start symbol, Pd is a set of production rules that represent visual patterns and Pf is a set of preference rules that represent pattern precedence.

24. The system of claim 23, wherein said visual properties include, for each token, the coordinates of the token in the displayed document image, the value of the token, the DOM path of the token in the DOM tree, the type of the token, and the name of the token.

25. The system of claim 23 wherein said hidden syntax convention of visual presentation is derived by performing the following steps:
   observing the visual relationship of tokens on how they form semantic units, and deriving visual patterns to represent the semantic unit; and
   observing precedence between different conflicting patterns and deriving pattern preference to represent their precedence.

26. system of claim 23, wherein said production rules are a four tuple (H, M, C, F), where H∈N is the head of the production, M⊆ΣUN is a multiset of symbols, C is a Boolean constraint defined on M and F is a constructor defined on M.

27. The system of claim 23, wherein said preference rules are a three tuple <I,U,W> where I identifies the types of conflicting instances, U defines a conflicting condition which said rule will handle, and W specifies a winning criteria to solve the conflict by picking one instance from the conflicting ones.

28. The system of claim 27 wherein said best-effort parser performs a procedure comprising the steps of:
   building a schedule graph for determining the order of applying production rules;
   building multiple parse trees simultaneously by grouping tokens using production rules in determined orders;
   pruning useless parse trees by checking preference rules; and
   outputting multiple potential useful parse trees that maximally cover the tokens in the document.

29. The system of claim 28, wherein the step of building a schedule graph comprises:
   adding dependency edges from head symbol to each component symbol for each production rule;
   adding restriction edges between two symbols for each preference rule;
   transforming restriction edges when graph is acyclic; and
   removing restriction edges if graph is still acyclic after said transformation.

30. system of claim 29, wherein the step of building multiple parse trees compromises the steps of:
   getting productions in the order determined by the schedule graph; and
   applying each production (H, M, C, F), in the identified order, to generate new instances of the head H, from the instances of the components M, by using the construction function F, if the components M satisfy constraint C.

31. The system of claim 29, wherein the step of pruning useless parse trees compromises the steps of:

for each newly generated instance, checking the conflicting condition of all preference rules to find all conflicts with existing instances; and applying the winning criteria for conflict resolution to remove false instances.

* * * * *